United States Patent
Leppan et al.

(10) Patent No.: US 9,558,284 B2
(45) Date of Patent: Jan. 31, 2017

(54) WEBSITE WITH ENHANCED BOOK MEMOS

(71) Applicants: David Leppan, Singapore (SG); Hristo Simeonov, Singapore (SG)

(72) Inventors: David Leppan, Singapore (SG); Hristo Simeonov, Singapore (SG)

(73) Assignee: HighEnd Pte. Ltd., Singapore (SG)

(*) Notice: Subject to any disclaimer, the term of this patent is extended or adjusted under 35 U.S.C. 154(b) by 0 days.

(21) Appl. No.: 13/647,439

(22) Filed: Oct. 9, 2012

(65) Prior Publication Data

US 2014/0047352 A1 Feb. 13, 2014

(30) Foreign Application Priority Data

Aug. 8, 2012 (SG) ................ 201205913-5

(51) Int. Cl.
G06F 3/048 (2013.01)
G06F 17/30 (2006.01)

(52) U.S. Cl.
CPC ......... G06F 17/30884 (2013.01); G06F 3/048 (2013.01)

(58) Field of Classification Search
None
See application file for complete search history.

(56) References Cited

U.S. PATENT DOCUMENTS

| | | | |
|---|---|---|---|
| 5,918,237 A | 6/1999 | Montalbano | |
| 6,486,891 B1 | 11/2002 | Rice | |
| 7,167,901 B1 | 1/2007 | Beadle | |
| 7,899,829 B1* | 3/2011 | Malla | G06F 17/30884 707/741 |
| 8,041,701 B2 | 10/2011 | Amato | |
| 2001/0056418 A1* | 12/2001 | Youn | G06F 17/30864 707/999.003 |
| 2002/0016786 A1 | 2/2002 | Pitkow | |
| 2003/0030679 A1 | 2/2003 | Jain | |
| 2005/0216850 A1* | 9/2005 | Ramos | G06F 17/30884 715/763 |
| 2005/0246626 A1 | 11/2005 | Lai | |
| 2006/0265417 A1* | 11/2006 | Amato | G06F 17/30864 707/999.102 |
| 2008/0154949 A1* | 6/2008 | Brooks | G06F 17/30884 715/206 |
| 2009/0138113 A1 | 5/2009 | Hoguet | |
| 2009/0228919 A1* | 9/2009 | Zott | H04N 7/17318 725/34 |
| 2009/0254529 A1* | 10/2009 | Goldentouch | G06F 17/241 715/243 |
| 2010/0057816 A1* | 3/2010 | May | G06F 17/30867 707/800 |

(Continued)

OTHER PUBLICATIONS

European Search Report dated Nov. 11, 2013 in corresponding EP application 13178671.7.

*Primary Examiner* — Hua Lu
(74) *Attorney, Agent, or Firm* — Brenda Pomerance

(57) ABSTRACT

A website is augmented to indicate the presence of saveable enhanced book memos. A user can save an enhanced book memo to their memobook database, then view their saved book memos, either at the website, or using a downloaded program when not at the website. The enhanced book memos can include text and/or multimedia files that are not present on the website.

18 Claims, 10 Drawing Sheets

(56) References Cited

U.S. PATENT DOCUMENTS

2010/0153848 A1* 6/2010 Saha ................. G06F 17/30884
                                                  715/721
2011/0191684 A1* 8/2011 Greenberg ................ G06F 3/01
                                                  715/719
2012/0159337 A1* 6/2012 Travilla ............. G06Q 30/0631
                                                  715/738

* cited by examiner

Highlighted Text
Fig. 4A
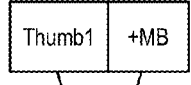
Highlighted Text
Fig. 4B
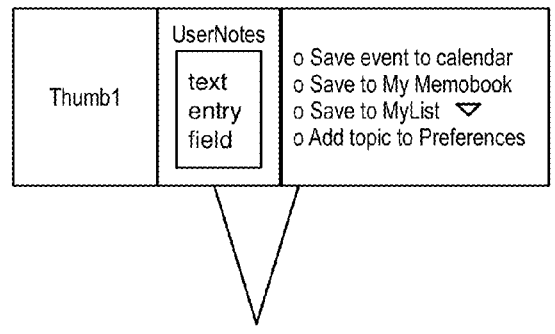
Highlighted Text
Fig. 4C
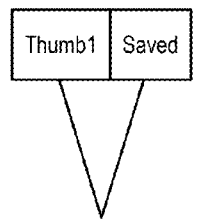
Highlighted Text
Fig. 4D

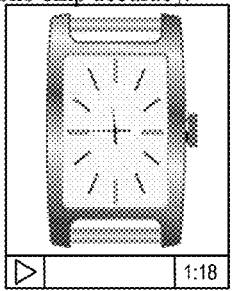

410

| 412 | EVENT Entry |
| 414 | Fashion Week Opening Party 416 |
| 418 | The breathlessly awaited annual showing of the top design houses. By invitation only. |
| 420 | DETAILS |
|     | February 12, 2012 |
| 422 | 111 Mercer Street Suite 301 |
|     | New York, NY 10003 |
|     | 7-10 pm, in tent behind building |
| 424 | RSVP ▷ |
| 426 | CONTACT |
|     | Holly Berns |
| 428 | 212 222-3333▷ |
|     | hollyb@fashionweek.com▷ |
| 430 | INSIDER TIPS |
| 432 | - The real action happens after the opening party, when small groups go to suites in the Y hotel nearby.<br>- Stevi McKing traditionally wears something exotic, and her entourage gives a preview of the season's "it" color. |
| 434 | NOTES |
| 440 | *Go! Chris C. will be there at 8 pm and wants to talk to you.* |
| 450 | Topics: fashion, design, party |
| 460 | Date entry added: 10 Dec 2011 |
| 470 | By: Jasmine Jones |

| 512 | PRODUCT Entry |
| 514 | Yachtsman Elite Collection 516 |
| 518 | For the discerning man. The most reliable watch on earth, with nanochrono chip accuracy. |
| 520 | [watch image] |
| 522 | ▷  1:18  524 |
|     | 528 |
| 526 | ◁  2/4  ▷ 527 |
|     | Yachtsman Elite 530 |
| 532 | LuxuryWatches ensures that the Yachtsman Elite timepiece is handmade using the finest robots by Swiss craftsmen. Only 16 of these superb watches are made annually, one for each anniversary of the Sailing of the Ships race in Monaco. |
| 534 | TO LEARN MORE |
|     | tinyurl.57AZ299  536 |
| 538 | NEAREST SHOWROOM |
|     | The Watch Store |
| 540 | 500 Fifth Avenue |
|     | New York, NY 10055 |
|     | 212 505-5555 |
|     | M-F 8a-7p, Sat 10a-6p, Sun noon-5p |
| 550 | Topics: time, watch, jewelry |
| 560 | Date entry added: 12 Dec 2011 |
| 570 | By: Username |

MEMOBOOK USERMADE ENTRY

605 Date: 14 December 2011
610 Site: www.nonpartysite50.com/new_arrivals.html
615 Type: o Event  o Place  o Product  o Person 620 [Thumbnail — Drag picture from webpage OR cut & paste (^C & ^V)]

625 o Public domain image
o Please check copyright

630 Title: [ ]

635 Description: [Cut & paste (^C & ^V) text from webpage]

640 Notes: [Enter your notes here]

645 [Uploaded or Scanned Image]

o Upload
o Scan
Description: [ ]

650 o Public domain image
655 o Please check copyright

660 Topics: Aardvarks ▽

665 Send me a reminder on date: [ ]

670 Share to "Popular Now": o Yes  o No

675 Share to: Amy Abacus ▽
680 or Enter phone number: [ ]
685 or Enter email address: [ ]

690 Save ▽

Fig. 9

WEBSITE WITH ENHANCED BOOK MEMOS

BACKGROUND OF THE INVENTION

The present invention relates to a method of making information easier to use, and more particularly, is directed to a website that has been augmented with information intended to be saved to a user's file of clippings.

Information users and information providers both want the information users to be able to easily save and recall information published on the Internet. For instance, a user wishing to purchase a high quality item typically browses different websites and may go to a nearby store as part of their purchase process.

The need for improved webpage bookmarks has been recognized.

U.S. Pat. No. 7,899,829, "Intelligent bookmarks and information management system based on same", shows a method for an individual browsing a website to generate "intelligent bookmarks" that include metadata for various fields, as shown in FIG. 3 (see fields for screenshot, URL, title, keywords, etc.). The reference discloses extracting information and metadata from website to be bookmarked (column 8, line 35-column 9, line 31). The reference further discloses a visual representation of the bookmark (element 44). When the bookmark is first created, the information and metadata is extracted from the website, but was not provided by the website for specific purpose of creating a bookmark. The reference discloses the online sharing of the intelligent bookmarks between a number of users in communication with an intelligent bookmark database (column 11, lines 24-58). The reference discloses publishing the bookmark as part of a blog posting for others to download (column 12, lines 31-30).

U.S. Pat. No. 5,918,237, "Method and apparatus for improved bookmark and histories entry creation and access", shows a method for generating multimedia bookmarks in which the there is embedded in an HTML document data that describes the location of multimedia bookmark description ("MBD") information (column 4, lines 44-55; column 5, lines 48-57). The user can then save the MBD as a multimedia bookmark that appears in the user's bookmark list (column 4, line 56-column 5, line 3; column 5, line 62-column 6, line 37). The reference further shows displaying the MBD bookmarks graphically in a bookmark list (column 7, lines 9-23, FIG. 6).

U.S. Pat. No. 7,167,901, "Method and apparatus for improved bookmark and histories entry creation and access", shows a method for generating bookmarks as part of a bookmark list with bookmarks that include metadata for various fields, as shown in FIG. 3 (see fields for Name, URL, description, and keywords). The reference discloses populating the description and keywords fields of the bookmarks from the metadata of the websites being bookmarked (column 4, lines 6-49). However, this metadata was not provided by the website for specific purpose of creating a bookmark. The representation of FIG. 3 is used only to manually edit the fields of the bookmark by the user.

U.S. Pat. No. 6,486,891, "Automated bookmarking of online advertisements", discloses a method of generating bookmarks associated with an online advertisement that has been placed within a webpage. The reference discloses causing a traditional click through advertisement to be displayed within a webpage (FIG. 5), and allowing the user to bookmark the website associated with the advertisement (column 6, lines 11-19) by causing the website to transmit to the client an applet that automatically bookmarks the associated website (column 6, lines 39-60). The reference is limited to standard browser bookmarks.

U.S. Pat. No. 8,041,701, "Enhanced graphical interfaces for displaying visual data", generally discloses enhanced graphical interfaces for various uses of web browsers. Specifically, the reference shows a graphical bookmark manager with a horizontal bookmark toolbar, multiple bookmark lists, and thumbnails (column 11, lines 7-53, FIG. 13).

There is still room to improve a user's ability to collect information while browsing web pages.

SUMMARY OF THE INVENTION

In accordance with an aspect of this invention, there are provided a website augmented with information that can be saved to a database associated with a user. The website has a web page for display by a browser program executing on a user device. The website also has at least one actuatable indication of a saveable file, the actuatable indication being displayed on the web page, the saveable file including at least a title, a thumbnail image and one text field. When a user actuates the actuatable indication, the saveable file is stored in the database associated with the user.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 4A-4D are further diagrams referred to in discussing how enhanced book memos according to the present invention are saved to a user's file of clippings;

FIGS. 7A and 7B show examples of enhanced book memos;

FIG. 9 is a chart showing a pop-up window enabling creation of a usermade enhanced book memo.

DETAILED DESCRIPTION

Figure 10:
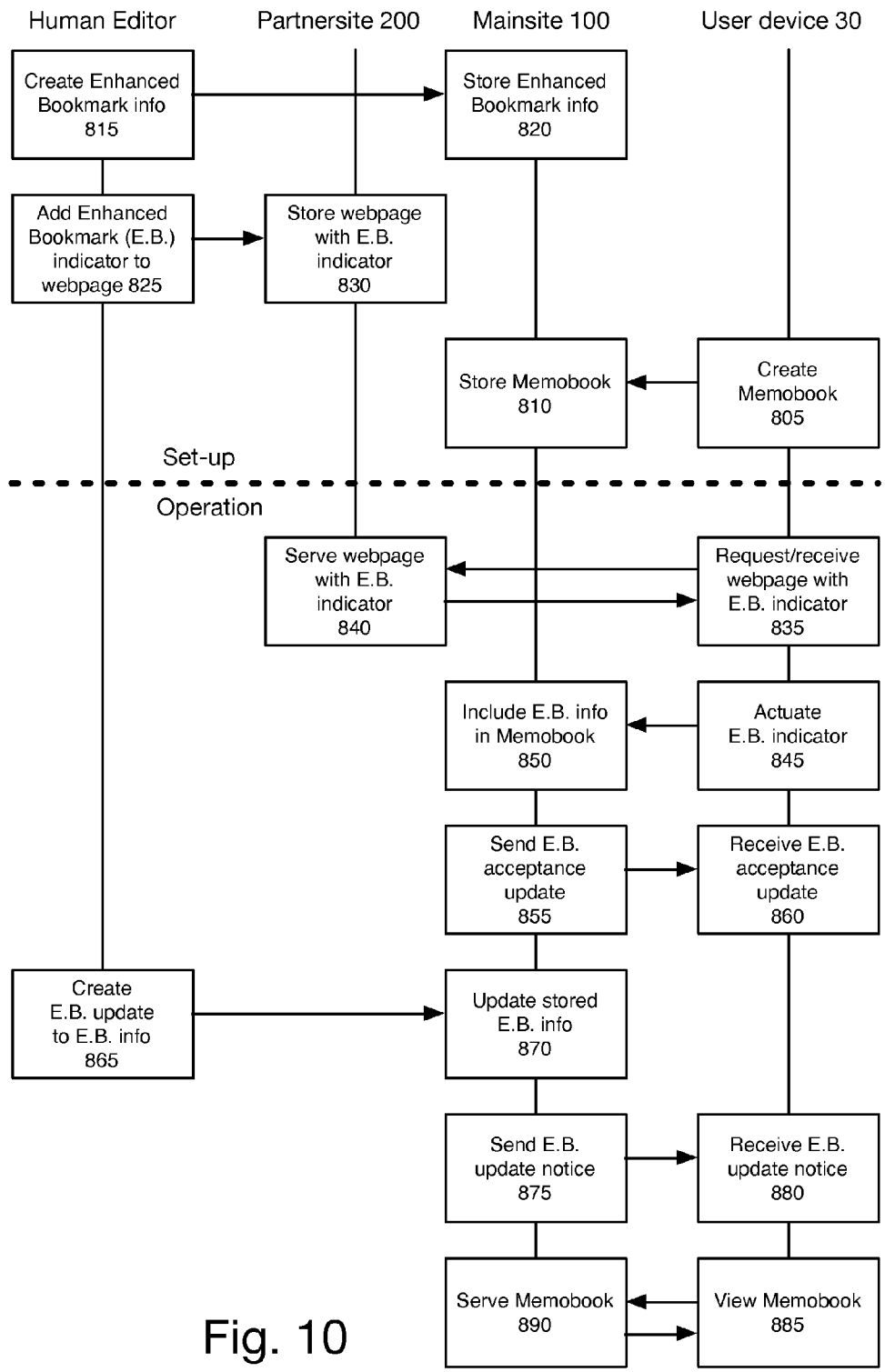
FIG. 10 is a flowchart showing enhanced bookmark set-up and operation.

In a set-up phase of a website, a human editor creates enhanced book memos (see FIG. 10 step 815), and associates the enhanced book memos with text or objects (such as photos or graphics or video) on a website (see FIG. 10 step 825). An enhanced book memo comprises structured data and optional data, as discussed below. A book memo differs from a bookmark: (i) the same book memo may be available at multiple web sites, whereas a bookmark is unique to a website, and (ii) the book memo does not necessarily indicate the web site at which it was found, whereas a bookmark indicates the web site at which it was found. A book memo is similar to a bookmark in that both relate to webpages, and both are saved to special data stores associated with a user.

In a set-up of a user account registered at the website, a user may optionally configure their "memobook" (see FIG. 10 step 805), that is, their book of book memos, with one or more lists.

In operation, a website displays text or objects associated with enhanced book memos in a specific manner, such as a different color or background or frame, or with a special icon superimposed thereon. A user hovers his or her cursor over an enhanced book memo to cause a window to pop-up, enabling saving of the enhanced book memo to the user's "memobook" possibly with annotations by the user.

During operation, a user can view their memobook, showing the contents of each enhanced book memo as created by the editor.

Accordingly, a user can quickly save meaningful information for things found on the Internet. The providers of information have the opportunity to give descriptive and operational information to users beyond the information presented on a web page. The enhanced book memos can be shared from one user to another in various ways. Enhanced book memos improve the ease of saving information, the ease of acting on information and the ease of purchasing products.

An embodiment of the present invention will now be discussed. The user's file or "book" of enhanced book memos is referred to as a "memobook". An enhanced book memo is also referred to as an "entry" or "clipping" in the memobook.

Figure 1:
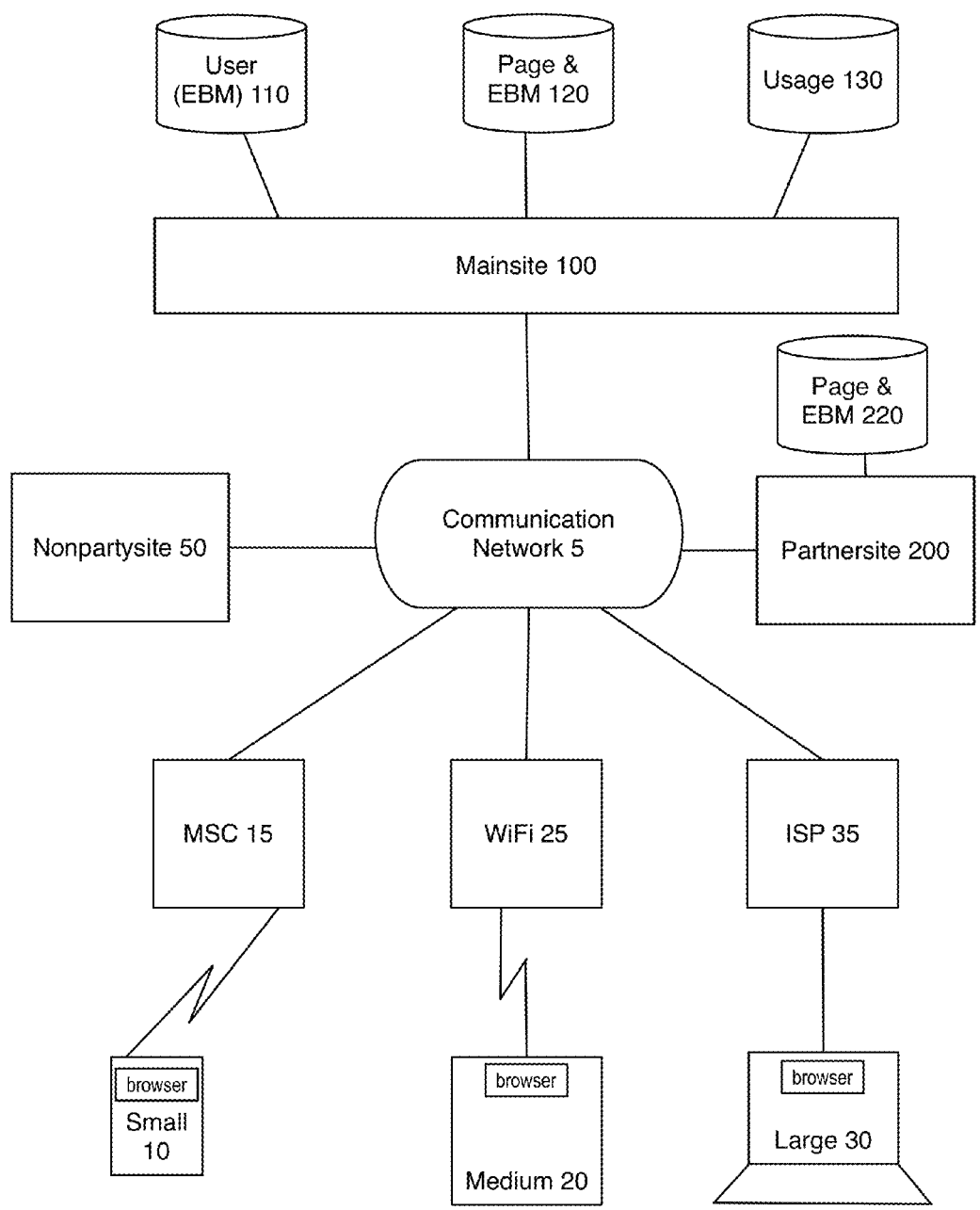
FIG. 1 is a block diagram of a hardware configuration in which the present invention is applied.

FIG. 1 is a block diagram of a hardware configuration in which the present invention is applied.

Communication network 5 is a group of computer processors and communications facilities configured to transmit information among parties connected thereto, generally in a store-and-forward manner, but also capable of operating to "stream" data. Communication network 5 may be the Internet.

Small user device 10 is a handheld device having a processor, data storage, display, data entry means, wireless communication capability and browser software for displaying webpage information. An instance of small user device 10 is an iPhone, made by Apple Computer.

Mobile switching center (MSC) 15 is a facility of a wireless communication carrier having one or more computing facilities coupled via communication lines to broadcast towers arranged in a cellular pattern that provide two-way wireless communication with user devices having wireless cellular communication capability, such as small user device 10.

Medium user device 20 is a portable device having a processor, data storage, display, data entry means, wireless communication capability and browser software for displaying webpage information. An instance of medium user device 20 is an iPad, made by Apple Computer.

Wireless network access point 25 is a facility enabling an electronic device such as medium user device 5, to wirelessly exchange data over communication network 5. Wireless network access point 25 has one or more computing facilities coupled via communication lines to an antenna having a range of about 20 meters (65 feet) indoors, and a somewhat larger range outdoors. Wireless network access point 25 may be a wi-fi hotspot operating according to the IEEE 802.11 protocol.

Large user device 30 is a general purpose computer, such as a desktop computer, notebook computer or laptop computer having a processor, data storage, display, data entry means, communication capability including wireline and/or wireless, and browser software for displaying webpage information.

It will be understood that in some cases, small user device 10 and/or large user device 30 is operable using wireless network access point 25; and in other cases, medium user device 20 and/or large user device 30 is operable using MSC 15. It will also be understood that other communication configurations are suitable, such as medium user device 20 communicating with large user device 30 via bluetooth protocol, which in turn couples to communication network 5.

Nonpartysite 50, mainsite 100 and partnersite 200 are each implemented using one or more general purpose computers with suitable storage and communication capability to function as web servers, including appropriate server software. Generally, nonpartysite 50, mainsite 100 and partnersite 200 operate according to hypertext transfer protocol, in which the server receives a request for a webpage from a user device via network 5, and responds by providing the requested webpage to the user device via network 5.

Nonpartysite 50 is a conventional website that does not include any features of the present invention.

Mainsite 100 is a website according to the present invention, including data storage 110 for user data including the user's memobook, data storage 120 for webpage data and enhanced book memos associated with the webpages, and data storage 130 for usage data. Although data storages 110, 120 and 130 are shown as physically separate in FIG. 1, in practice, they may operate on shared equipment configured with one or more physical storage units operative to store and retrieve data using suitable electromechanical, magnetic and/or optical technologies. Users register at mainsite 100 to become registered users.

Each registered user has a respective memobook stored as part of their user data in data storage 110, that is initially populated with one entry. In some embodiments, a user may download all or part of their memobook to their local computer for local viewing and editing. This is helpful when, e.g., a user expects to be on an airplane and unable to communicate with mainsite 100.

During creation of webpages for mainsite 100, using editing software (not shown) an editor and/or developer adds special icons or signifiers for enhanced book memos to the webpages stored in data storage 120 (see FIG. 10 step 825). In one embodiment, the editing software is based on PyroCMS, an open source content management system, available at www.pyrocms.com, customized to (i) enable creation of enhanced book memos via a new content type (the new content type is an enhanced book memo), (ii) enable association of an enhanced book memo with an item of content on a web page, the item being one or more words, or a media object, and (iii) enable association of an enhanced book memo with an event in a calendar page of an existing calendar program.

A user adds an entry, also referred to as an enhanced book memo or clipping, to his or her memobook by clicking on one of the special icons or signifiers on a webpage provided by mainsite 100 (see FIG. 10 step 845).

Mainsite 100 enables a user to view (see FIG. 10 step 885) and edit his or her memobook, as discussed below.

Mainsite 100 detects the display size of a user device, and serves webpages to the user device optimized for the device's display size. For instance, for a small display size, a webpage is configured in a one-column format, whereas for a large display size, a webpage may be configured in a four-column format.

Partnersite 200 is a website that is operated by a third party. During creation of webpages for partnersite 200, an editor and/or developer adds special icons or signifiers for enhanced book memos to the webpages stored in data storage 220 (see FIG. 10 step 830). In this embodiment, the enhanced book memos for partnersite 200 are stored in data storage 220. When a user registered at mainsite 100 receives a webpage from partnersite 200, the user can add an enhanced book memo from partnersite 200 to his or her memobook maintained at mainsite 100.

Generally, mainsite 100 provides an application programming interface (API) for use by a developer at partnersite 200, explaining how to create an enhanced book memo and embed it on the web site of partnersite 200. In some cases, the user must go to mainsite 100 to access their memobook. In other cases, the developer at partnersite 200 uses the API to make the user's memobook accessible to the user at the web site of partnersite 200.

In other embodiments, discussed below, the enhanced book memos are maintained at mainsite 100 (see FIG. 10 step 820), and can be updated by the creator/owner of the enhanced book memo (see FIG. 10 step 865).

Figure 2:
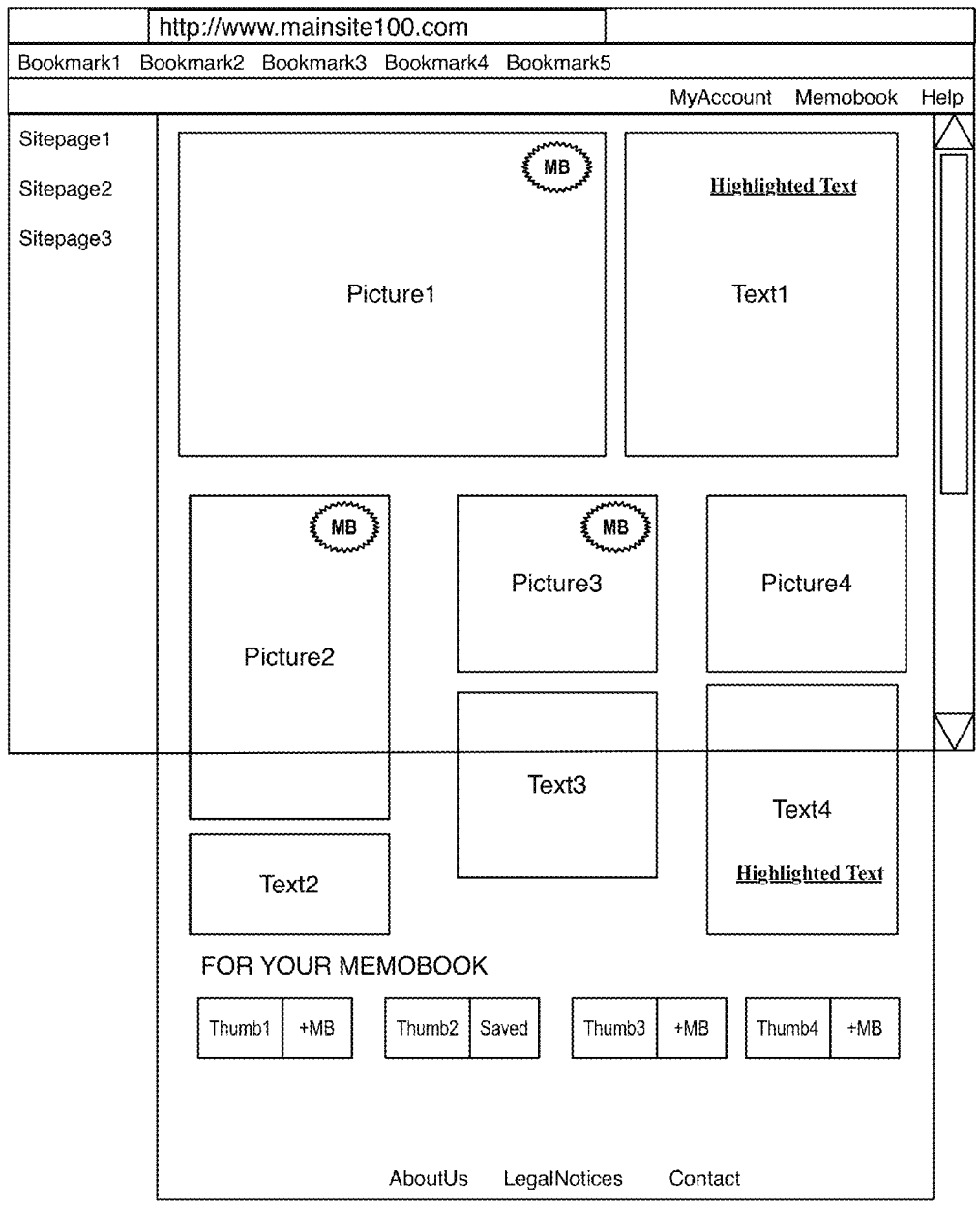
FIG. 2 is a chart showing a webpage, and a portion thereof that is visible in a browser.

FIG. 2 is a chart showing a webpage, and a top portion thereof that is visible in a browser. The top two rows represent information generated from the browser software in the user device, such as an address field and conventional bookmarks arranged in a horizontal navigation bar.

The third row is provided by a webpage from mainsite 100, and includes a horizontal navigation bar with links to "MyAccount", "Memobook" and "Help". Clicking on (or otherwise suitably indicating) the Memobook link enables the user to view their memobook, as discussed below. The Memobook link is an actuatable indication of a database program.

The user's browser software enables scrolling of the webpage in the viewable area of the browser.

The body of the webpage has four multi-media areas Picture1, Picture2, Picture3 and Picture4, which represent multi-media files such as a graphic image, photograph, audio/video file or audio file. Proximate to each of the multi-media areas is a logically associated text area, Text1, Text2, Text3 and Text4.

The webpage in FIG. 2 has five indicators for enhanced book memos. An icon, shown as "MB" in a multi-pointed oval, appears as an overlay on each of Picture1, Picture2 and Picture3. Specially highlighted text in each of Text1 and Text4 indicates that the text is associated with an enhanced book memo. The highlighting may include one or more of a different color than the main text, a different font type or font size or font emphasis (bold, underline, italic), a different background color, or a special effect such as blinking text. Each icon and specially highlighted text is an actuatable indication of a saveable file, the enhanced book memo.

The enhanced book memo indicated by the icon overlaid on Picture1 is the same as the enhanced book memo indicated by the specially highlighted text in Text1 . That is, there can be multiple ways to indicate the same enhanced book memo.

At the bottom of the webpage shown in FIG. 2, there is provided an area labelled "FOR YOUR MEMOBOOK" that indicates the four enhanced book memos on the webpage. Each of the enhanced book memos is represented as its thumbnail image. If the user has not saved the enhanced book memo to their memobook, there is a save button, labelled as "+MB" in FIG. 2, next to the thumbnail for the enhanced book memo. If the user has saved the enhanced book memo to their memobook, there is a "Saved" button next to the thumbnail for the enhanced book memo.

Clicking on the save button causes the enhanced book memo to be saved to the user's memobook, and the save button is toggled to a saved button. In this embodiment, a user must go into their memobook to delete an enhanced book memo.

In other embodiments, clicking on the saved button causes the enhanced book memo to be deleted from the user's memobook, and the saved button is toggled to a save button.

FIGS. 3A-3D are diagrams referred to in discussing how enhanced book memos according to the present invention are saved to a user's file of clippings, that is, the user's memobook.

Figure 3A:
FIGS. 3A-3D are diagrams referred to in discussing how enhanced book memos according to the present invention are saved to a user's file of clippings.

FIG. 3A represents the enhanced book memo icon as viewed on a webpage.

Figure 3B:
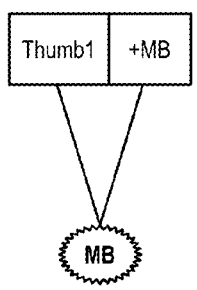

FIG. 3B shows a pop-up image, sometimes referred to as a simple pop-up, that appears when a user hovers his or her cursor over the enhanced book memo icon. In some cases, the rest of the webpage is displayed in a faded or greyed format, to indicate that only the pop-up image is actionable. The simple pop-up image comprises the thumbnail image for the enhanced book memo along with a save button, as discussed above.

Figure 3C:
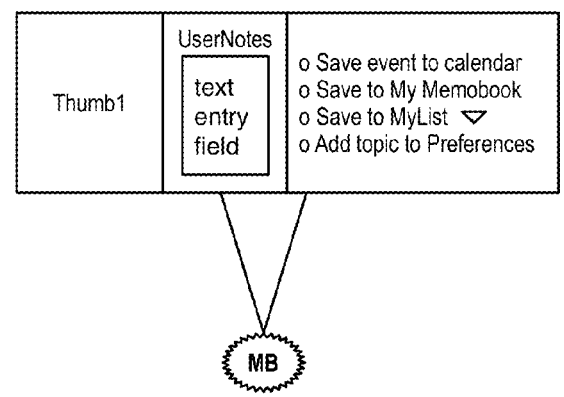
Figure 3D:
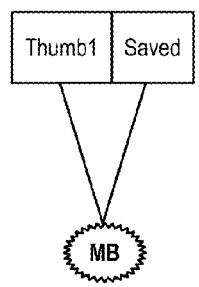

FIG. 3D shows the pop-up image after the user has clicked on (or otherwise indicated) the save button (see FIG. 10 step 845); in some embodiments, the save button has toggled to a saved button (see FIG. 10 step 860), as discussed above. If the user clicks on the saved button, the enhanced book memo is deleted from the user's memobook, and the saved button toggles to a save button.

FIG. 3C shows an alternative version of the pop-up image of FIG. 3B, referred to as a modal window (a child window that requires that the user interact with it before returning to the parent application), and sometimes referred to as a complex pop-up, that appears when a user hovers his or her cursor over the enhanced book memo icon. In some cases, the user controls whether the pop-up is simple or complex, as discussed below. In other cases, the editor of the enhanced book memo specifies which of simple or complex format should be used. The complex pop-up image comprises the thumbnail image for the enhanced book memo, a text entry field so that the user can record his or her notes, and a set of actions that can be selected by the user, shown as:

"Save event to calendar"—this assumes that the enhanced book memo is of the "event" type (discussed below), and generates a standard calendar event file, such as an .ics file, and downloads the file to the user's device, that is, to device 10, 20 or 30. Generally, the operating system for device 30 requires the user to double click on the event file to add it to the user's calendar program (such as Microsoft Outlook), while the operating system for devices 10, 20 automatically adds a received calendar file to the user's calendar program;

"Save to My Memobook"—causes the enhanced book memo to be added to the general portion of the user's memobook;

"Save to MyList"—if the user has defined any lists in his or her memobook, then this choice is on the menu. Selecting this choice leads to a drop-down window that is scrollable, with a box next to the name of each list that the user has defined. The user checks one or more lists to which the enhanced book memo should be addedenhanced book memo;

"Add topic to preferences"—adds the topics associated with the enhanced book memo to the user's preferred topics.

In other cases, other functionality is provided in the complex pop-up associated with an enhanced book memo.

FIGS. 4A-4D are further diagrams referred to in discussing how enhanced book memos according to the present invention are saved to a user's file of clippings. FIGS. 4A-4D are similar to FIGS. 3A-3D and will not be discussed in detail, for brevity. The point of FIGS. 4A-4D is that the specially highlighted text is processed in similar manner as the icon for the enhanced book memo, to save an enhanced book memo to the user's memobook.

Figure 5:
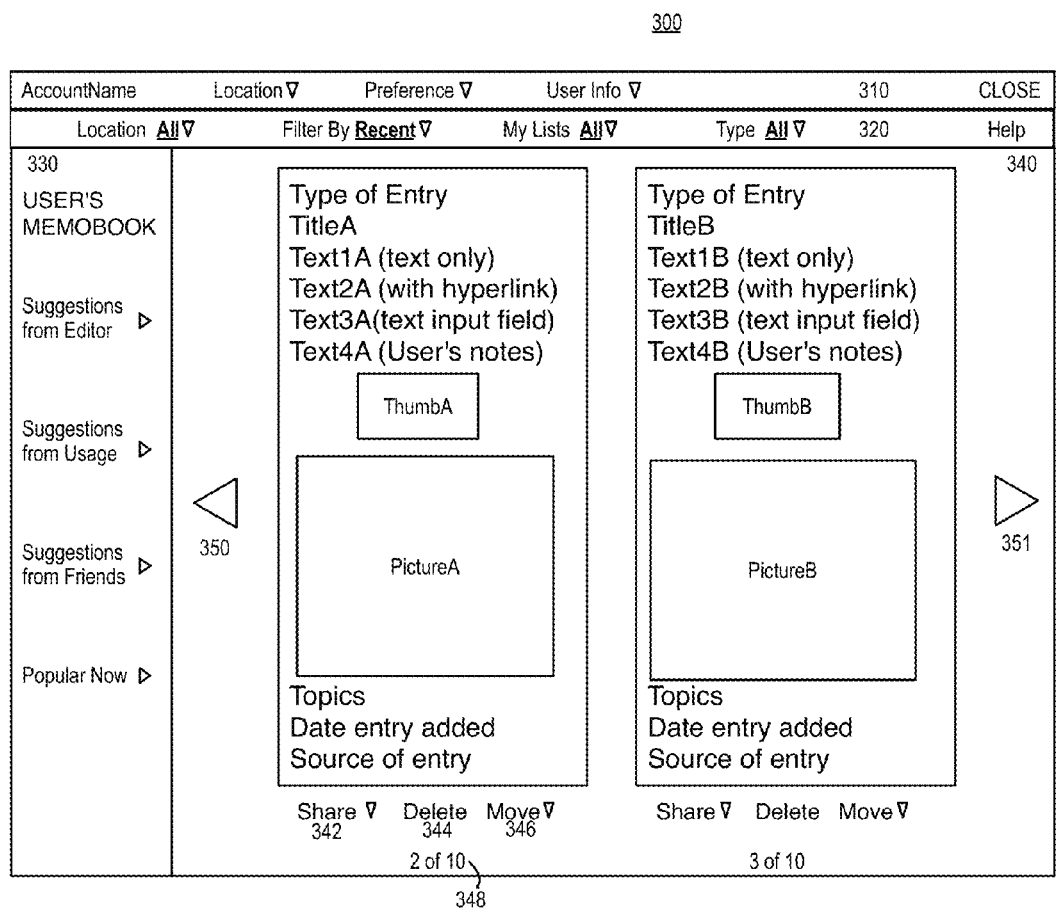
FIG. 5 is a chart showing the format of a user's book of enhanced book memos in original view.

FIG. 5 is a chart showing the format of a user's book of enhanced book memos, that is, the user's memobook 300. When the user clicks on (or otherwise actuates) the Memobook link in the top horizontal navigation bar of the webpage of FIG. 2, the pop-up (modal) window display in FIG. 5 appears on the user's display. In some embodiments, instead of a modal window, the memobook is displayed in a sidebar. In other embodiments, the memobook is displayed in split-screen fashion.

Top row 310 of the memobook has a label "Account-Name", and drop-down menus, indicated by inverted triangles, labelled "Location", "Preference" and "UserInfo".

"AccountName" indicates the registered account name of the user.

"Location" is a menu of the locations selected by the user in "User Info", and represents the user's current location, along with a "where I am now" option. When information in an enhanced book memo is location dependent, the place in this "Location" field is used for the enhanced book memo contents. For instance, the enhanced book memo may be configured to show the nearest location of a merchant to the user. For the "where I am now" option, mainsite 100 determines the user's current location based on information provided by the user's device.

"Preference" enables the user to adjust features of the memobook. Each row of the Preference menu indicates a feature, followed by the selections for the row. The default selection is the first in each row, but the user may click on a different selection to select it. The operative selection is highlighted such as by boldface text. Table 1 provides the features, selections and a brief description.

TABLE 1

| Feature | Selections | Description |
| --- | --- | --- |
| Content display | Original \| Catalog | Content Display controls how the enhanced book memos are displayed. Original corresponds to how the editor laid out the enhanced book memo (see FIG. 5 for screen format, FIGS. 7A and 7B for instances of enhanced book memos); Catalog provides a matrix of thumbnail images (see FIG. 6) |
| Content history | Current \| Redlined | If an editor makes changes to an enhanced book memo, the user must set Content History to "Redlined" to see prior versions of the content. The setting of "Current" shows only the most recent version of the content. |
| Gender | Male \| Female \| Both | If the content of an enhanced book memo depends on the gender of a user, the gender is obtained from this feature. This is particularly helpful when shopping for gifts. |
| Icon display | Simple \| Complex | Icon display controls whether the pop-up for an enhanced book memo identifier on a webpage is simple (see FIGS. 3B, 4B) or complex (see FIGS. 3C, 4C). |
| Language | English \| Mandarin | Language controls the language in which the content of the enhanced book memo is displayed. |
| Popular Now | Views \| Clicks \| Shares | Popular Now controls how popularity is determined for usermade enhanced book memos: by the number of times they are viewed, the number of times someone clicks on some part of their content, or the number of times that the enhanced book memo is shared to someone else. |
| Update notices | Off \| Email \| Text | Update controls whether the user gets active explicit notification each time the contents of an enhanced book memo are changed, and if so, how (as an email or a text message). |

"User Info" is a menu of user-related descriptive information, discussed in Table 2.

TABLE 2

| Item | Sample | Description |
| --- | --- | --- |
| AccountName | JBL1965 | The unique account name for a registered user. |
| Password | ****** | The password chosen by the user. |
| Email address | jbl1965@yahoo.com | The email address of the registered user. |
| Text message address | 212 234-5678 | A phone number or email address at which the user can receive text messages. |
| Primary location | Singapore | The default location of the user. |
| Other locations | Brussels London New York Palo Alto Jerusalem | Other locations that the user has selected as being of interest. Generally, the selection is from a list of locations provided by mainsite 100 during registration, and updatable from the webpage shown in FIG. 2. |

TABLE 2-continued

| Item | Sample | Description |
| --- | --- | --- |
| Topic Alerts | parties<br>sculpture<br>cars | Topics that the user has indicated as being of interest, either explicitly when registering or while saving an enhanced book memo (see complex pop-up FIGS. 3C, 4C). |
| Access Control WhiteList | drew747<br>gaga1010 | User names of other registered members of mainsite 100 that are allowed to view lists of enhanced book memos created by this user, and from whom this user will accept lists. |
| Access Control Blacklist | bobo292 | User names of other registered members of mainsite 100 that this user will not accept lists from. |

At the rightmost side of the top row of the memobook is a label "CLOSE". The user clicks this to close the memobook and return to the webpage shown in FIG. 2.

Second row 320 of the memobook has drop-down menus, indicated by inverted triangles, labelled "Location", "Filter By", "My Lists", "Type" and a link labelled "Help". This row is used to select which of the enhanced book memos are currently displayed, and their order of display.

"Location" has choices of All, the user's Primary location and each of the user's other locations.

"Filter By" has choices of Recent, All, Most Popular and Archived. "Recent" provides a predetermined number of recent enhanced book memos, such as ten. "All" provides all of the enhanced book memos in the user's memobook. "Most Popular" provides the enhanced book memos in the user's memobook that have been viewed by the most number of other users during the most recent predetermined time period, such as the most recent 24 hours. If an enhanced book memo has not been viewed by a user for a predetermined duration, such as 30 days, mainsite 100 automatically places the enhanced book memo into the archive section of the user's memobook.

"My Lists" enables the user to view all of the lists viewable from their memobook, and to create and delete lists. Initially, there are no lists. Lists arise from creation by this user, or from sharing by another user.

To create a list, the user selects "Create" from the "MyLists" menu, provides a list name and indicates whether it is public or shared; sharing occurs with the users on this user's access control whitelist. The user associates enhanced book memos with this list either from the complex pop-up (see FIGS. 3C, 4C) or by moving from another part of their memobook (see "Move" menu underneath each enhanced book memo in FIG. 5).

To receive a shared list from someone else, this user must have the other user in this user's access control whitelist. Except for adding notes to a shared enhanced book memo, the sharee user has read-only access to the enhanced book memo.

"Type" has choices of "Product", "Event", "Place" or "Person". Mainsite 100 may add additional types. "Product" indicates a purchaseable item. "Event" indicates something that occurs either once or periodically, such as a party, arts performance or a weekly happy hour. "Place" indicates a destination, such as a museum, restaurant, hotel or theater. "Person" indicates a service provider such as a doctor, lawyer, accountant, consultant, nanny, coach and so on.

The remainder of the memobook display comprises left pane 330 and main area 340.

Left pane 330 of memobook 300 has five rows. The first row is labeled "USER'S MEMOBOOK". The other rows each alter what is in the main area, indicated by right-pointing triangles, are are respectively labelled "Suggestions from Editor", "Suggestions from Usage", "Suggestions from Friends" and "Popular Now".

When the "USER'S MEMOBOOK" is selected, only enhanced book memos that the user has explicitly added to his or her memobook are displayed in the main area, along with enhanced book memos, if any, from lists shared by other users on this user's access control whitelist.

"Suggestions from Editor" changes the display to a predetermined number of enhanced book memos selected by the editor of mainsite 100, such as twelve. The editor may select enhanced book memos because the editor finds them interesting, or because the creator of the enhanced book memo has paid to have their enhanced book memo shown. Each suggested enhanced book memo can be saved to the user's memobook, using the indications shown in FIGS. 3A-4D.

"Suggestions from Usage" changes the display to a predetermined number of enhanced book memos automatically selected by mainsite 100 based on collaborative filtering of the user's saved enhanced book memos. Collaborative filtering is a method of making automatic predictions about the most recent interests of a user by seeing what other users with similar interests also find of interest. Each suggested enhanced book memo can be saved to the user's memobook, using the indications shown in FIGS. 3A-4D.

"Suggestions from Friends" shows individual enhanced book memos, and lists of enhanced book memos, sent to this user by other registered users who are not on this user's access control whitelist, and who are not on this user's access control blacklist. Each suggested enhanced book memo can be saved to the user's memobook, using the indications shown in FIGS. 3A-4D.

"Popular Now" shows a predetermined number of user-made enhanced book memos, such as eight, that were indicated as shareable by the creating user, and fit the popularity criteria selected by this user via the Preference menu of first row 310. Usermade enhanced book memos are discussed below with regard to FIG. 9.

Main area 340 of memobook 300 has left-pointing arrow 350 fixed at its left side, right-pointing arrow 351 fixed at its right side, and displays two enhanced book memos. Left and right arrows 350, 351 enable the user to change which enhanced book memos are displayed, as if the bookmarks are lined up horizontally, and can be examined two at a time.

An enhanced book memo has a Type (see Type menu of second row 320); a Title; an associated thumbnail image; optional text areas that include text only, hyperlinks to other websites, such as a webpage of partnersite 200, text input fields for text that is to be sent somewhere, such as to partnersite 200, and/or a field in which the user can write a note to jog their own memory or for the benefit of someone to whom the enhanced book memo is sent by the user; optional associated multimedia files such as graphics, photographs, audio files and/or audio/video files, generally provided by the editor who created the book memo, but in some cases, a field enabling uploading by a user to their own book memo (see FIG. 9); and administrative information such as topics relating to the enhanced book memo, the date the enhanced book memo was created and/or updated, and who created the enhanced book memo. In some embodiments, the enhanced book memo also includes the location from which the enhanced book memo was saved to the memobook.

Examples of enhanced book memos are provided in FIGS. 7A and 7B, discussed below.

In main area 340, underneath each of the enhanced book memos is a function Delete 344 and two drop-down menus, indicated by inverted triangles, Share 342 and Move 346.

Delete 344 enables a user to delete the enhanced book memo from memobook 300.

Share 342 enables a user to send an enhanced book memo to another registered user by providing the username (the recipient sees the enhanced book memo in their "Suggestions from Friends" section), or to a non-registered user by providing an email address or a phone number for text messaging a link to the enhanced book memo. Generally, non-registered members can see most of the content of enhanced book memos, but they may need to register to see certain content such as "insider tips" or notes added by registered users other than the sending registered user.

Move 346 enables a user to move an enhanced book memo from the "All" (default) part of memobook 300 to one of the user's lists. In this embodiment, to move an enhanced book memo to a list shared from another user, this user must explicitly send the enhanced book memo to the other user who can then add it to the shared list.

At the bottom-most area of the main area of the memobook, under each enhanced book memo is sequence identifier 348 indicating "N" of "M" where N is the sequence number and M is the total number of enhanced book memos. In some embodiments, instead of the "N of M" format, there is a progress bar that is movable from left to right to indicate what portion of the total is displayed.

Figure 6:
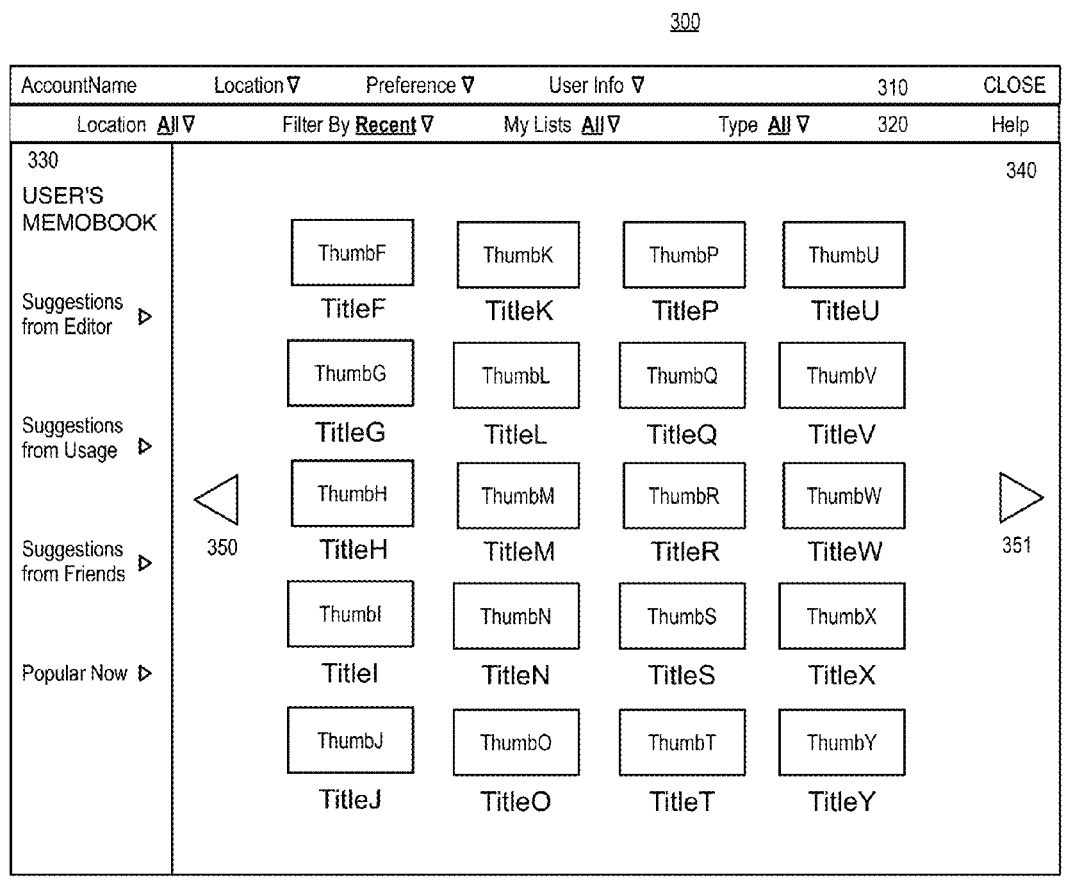
FIG. 6 is a chart showing the format of a user's book of enhanced book memos in catalog view.

FIG. 6 is a chart showing the format of memobook 300 of enhanced book memos in catalog view (see top row 310, Preferences, Content Display). The format of FIG. 6 is similar to the format of FIG. 5, and for brevity, only differences will be discussed.

The purpose of the format of FIG. 6 is to enable a user to quickly assess a large group of enhanced book memos.

In main area 340 of memobook 300, a matrix of thumbnail images for respective enhanced book memos are displayed along with the title of the enhanced book memo. When the user hovers the cursor over the thumbnail or title, a pop-up window appears showing the full enhanced book memo (see FIGS. 7A and 7B). FIG. 6 shows a matrix having four columns and five rows, for a total of twenty thumbnails. Using the left-pointing and right-pointing arrows, the display of thumbnails "slides" by one column at a time to the left or right.

FIGS. 7A and 7B show enhanced book memos 410, 510. As mentioned above, the structured data for an enhanced book memo includes at least the type, title, thumbnail image, at least one text area, topics, creation date and creator, and may optionally include header(s), additional text areas, hyperlinks, text input fields (for notes to other users or to a website), and multi-media files. In some embodiments, a sponsor logo is provided in an enhanced book memo.

FIG. 7A shows enhanced book memo 410 for an event, "Fashion Week Opening Party". Thumbnail image 416 is of a stiletto high-heeled shoe. There is an "RSVP" button which, when actuated, links to the website of the event. There is a "Notes" area where a user (not the editor who created the enhanced book memo), has provided a note to this user. The note is probably from the source of the enhanced book memo (the other registered user who sent it to this user), identified as "Jasmine Jones" at the bottom of the enhanced book memo. Entry type 412 shows this is an "event" type of enhanced book memo. Title 414 is "Fashion Week Opening Party" and has corresponding text 418. Heading 420 is "DETAILS" and has corresponding text 422 and button 424 for actuating a hyper link. Heading 426 is "CONTACT" and has corresponding text 428. Heading 430 is "INSIDER TIPS" and has corresponding text 432. Heading 434 is "NOTES" and has corresponding text 440, displayed in a different font than the other text areas to indicate that it has a different creator. Topics 450 were provided by the creator of enhanced book memo 410. Date added 460 was automatically provided by mainsite 100. Creator name 470 was automatically provided by mainsite 100.

FIG. 7B shows enhanced book memo 510 for a product, a men's watch. Thumbnail image 516 is of the face of the watch. The upper portion of the enhanced book memo includes a carousel of four multimedia images; the image shown, the second of four, is actually an audio/video file having a play length of 1 minute 18 seconds. About two-thirds of the way down, there is a hyperlink, such as to a webpage of partnersite 200, where the user can find more information about this product, and possibly purchase it. Entry type 512 shows this is a "product" type of enhanced book memo. Title 514 is "Yachtsman Elite Collection" and has corresponding text 518 and is set up with a multi-media carousel having title 530, n of m indicator 528 (where n is the current media file and m is the total number of media files), with back button 526 and forward button 527 for navigating between the media files. As shown, the second media file is presented in media player 520. Media player 520 includes play/stop button 522, and media time duration 524. Text area 532 does not have a corresponding heading Heading 534 is "TO LEARN MORE" and has corresponding text 536, which is a hyperlink. Heading 538 is "NEAREST SHOWROOM" and has corresponding text 540. Note that if the user has configured their memobook to use their current location, as determined by mainsite 100 based on the user's device, text 540 may differ as the user moves about. Topics 550 were provided by the creator of enhanced book memo 510. Date added 560 was automatically provided by mainsite 100. Creator name 570 was automatically provided by mainsite 100.

The feature of text changing depending on a user's location is particularly useful for vendors having many locations in one city, such as parking lots or coffee cafes; the user can quickly find the nearest location by simply checking their memobook.

Figure 8:
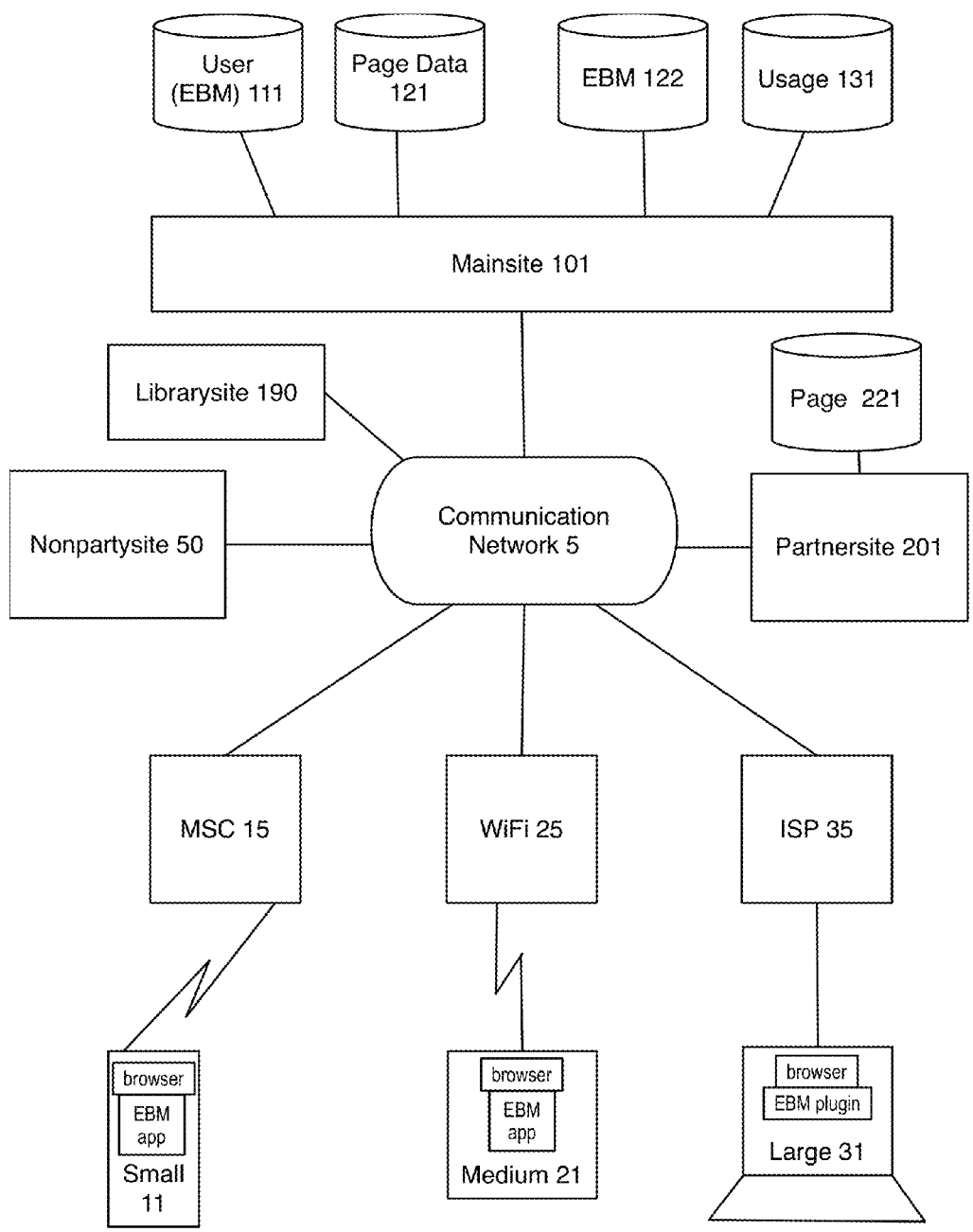
FIG. 8 is a block diagram of another hardware configuration in which the present invention is applied.

FIG. 8 is a block diagram of another hardware configuration in which the present invention is applied. FIG. 8 is similar to FIG. 1, and for brevity, only differences will be discussed: a central repository of enhanced book memos, an application programming interface (API), a browser plug-in, an end-user application program, and a librarysite.

Data storage 122 at mainsite 101 serves as a central repository for all enhanced book memos at all sites, that is, mainsite 101 and partnersite 201. In contrast, in the embodiment of FIG. 1, enhanced book memos for partnersite 200 are stored in data storage 220 at partnersite 200. Having a central repository makes it easier for mainsite 101 to ensure all enhanced book memos are processed similarly.

In some embodiments, when a user saves an enhanced book memo to their memobook, a pointer to the enhanced book memo, as stored in central repository 122, is added to the user's memobook in user data 111.

Mainsite 101 provides an API for creating enhanced book memos, adding them to central repository 122, and indicating the availability of an enhanced book memo at partnersite 201. Accordingly, in the embodiment of FIG. 8, developers are not restricted to the enhanced book memo creation tools available at mainsite 101.

To improve the utility of the user's memobook, it is recognized that the user ought to be able to create his or her own enhanced book memos, so that the user can gather all information they are interested in into a single place. Accordingly, a facility is provided whereby a user can make a usermade enhanced book memo for a conventional website, store their usermade enhanced book memo in their memobook thereby making it available for sharing, and optionally add their usermade enhanced book memo to a pool of other usermade enhanced book memos for possible inclusion in the "Popular Now" feature of the memobook. In some variations of the present invention, usermade enhanced book memos are also included in the "Suggestions from Usage" portion of the memobook. Usage of the usermade enhanced book memos may be recorded in usage data 131 of mainsite 101.

To be able to create usermade enhanced book memos, the user sets his or her registration information (not shown) to download a browser plug-in software program. Mainsite 101 then downloads a book memo maker application program that is installed as part of the user's browser's toolbar in large device 31. When the user is at a website, such as nonpartysite 50, that is not already configured with enhanced book memos, the user clicks on the book memo maker program, or otherwise begins its operation. The program creates a pop-up (modal) window on the user's browser, which also displays a web page of nonpartysite 50.

FIG. 9 is a chart showing a pop-up (modal) window with book memo maker 600 enabling creation of a usermade enhanced book memo.

At the top of the window, there is administrative information that is automatically filled in by book memo maker 600, including the date of creation of the enhanced book memo 605 and the address of the webpage 610 associated with the enhanced book memo. In some embodiments, the book memo need not be associated with a web page. The user selects which type 615 of enhanced book memo this is, from the types defined by mainsite 101 (see row 320 of memobook 300).

The user then drags, or cuts and pastes, an image from the current web page into thumbnail field 620 for book memo maker 600, which automatically resizes it to an appropriate size for a thumbnail image. To the right of the thumbnail field are selection buttons 625 so that the user can indicate the copyright status of the image, either public domain, or to be checked by mainsite 101. Generally, if the user does not share this book memo, there will be no copyright problem. However, if the user wants to share this book memo, mainsite 101 takes suitable action to obtain permission to use the thumbnail image, such as preparing and sending an email to the administrator for nonpartysite 50, listed in the WHOIS database.

Next, the user provides title 630 for the enhanced book memo, and then descriptive information 635. Optionally, the user enters personal note 640 in the enhanced book memo.

Next, the user can upload a file into area 645 that becomes part of this book memo, the file representing text or multimedia, i.e., graphics, image, audio or audio/video, and provide description 655 of the uploaded material. When the user device has scan capability, the file can be scanned directly into the book memo. To the right of the upload/scan field are selection buttons 650 so that the user can indicate the copyright status of the image, either public domain, or to be checked by mainsite 101.

Then, the user selects which topic(s) 660 the enhanced book memo relates to, from a menu of topics provided by book memo maker 600 and/or by entering their own topic keywords.

The user can then configure automatic reminder 665 to themselves, which mainsite 101 sends according to the user's notice preference.

Finally, the user indicates via selector 670 whether they wish to contribute this enhanced book memo to a pool of usermade enhanced book memos maintained by mainsite 101, and whether they wish to send this enhanced book memo to anyone in particular, from drop-down list 675, by entering phone number 680 of the destination device, or by entering email address 685 of the destination.

When the user is satisfied with the enhanced book memo, he or she actuates Save button 690 on the bottom of book memo maker 600, enabling the user to save the enhanced book memo to any of their created lists.

Returning to FIG. 8, the enhanced book memo browser plug-in at large device 31 also enables the user to access their memobook, stored in data storage 111 at mainsite 101, even when the user is not at mainsite 101, as long as the user's browser is connected to communication network 5.

Medium device 21 includes an enhanced book memo application program, downloaded by the user to medium device 21 from mainsite 100. The application program enables the user to access their memobook, stored in data storage 111 at mainsite 101, even when the user is not at mainsite 101, as long as medium device 21 has a connection to communication network 5. In some embodiments, the enhanced book memo application program downloaded to medium device 21 enables the creation of user made book memos, as described with regard to FIG. 9.

Small device 11 includes an enhanced book memo application program, downloaded by the user to small device 11 from mainsite 100. The application program enables the user to access their memobook, stored in data storage 111 at mainsite 101, even when the user is not at mainsite 101, as long as small device 11 has a connection to communication network 5. In some embodiments, the enhanced book memo application program downloaded to small device 11 enables the creation of user made book memos, as described with regard to FIG. 9.

Librarysite 190 is a source of various browser plug-ins and downloadable application programs. Each of the enhanced book memo browser plug-in and the enhanced book memo application program may be downloaded to a user device from librarysite 190, as an alternative to downloading from mainsite 101.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

FIG. 10 shows the set-up for an enhanced bookmark above the horizontal dashed line, and shows the operation of an enhanced bookmark below the horizontal dashed line.

The set-up of an enhanced bookmark will now be described.

At step 815, a human editor (not shown, but could be at nonpartysite 50, or could use a user device such as user device 20) assembles the information for an enhanced bookmark, and via communication network 5, sends the enhanced bookmark to mainsite 100. At step 820, mainsite 100 receives the enhanced bookmark and stores it in EBM storage 120 (see FIG. 1). Then, at step 825, the human editor edits a webpage stored in page storage 220 coupled to partnersite 200, to include an enhanced bookmark indicator that points to the enhanced bookmark stored in EBM storage at step 820. At step 830, partnersite 200 stores the webpage with the enhanced bookmark indicator in page storage 220, in lieu of the webpage without the enhanced bookmark indicator.

It will be appreciated that the webpages may be stored at mainsite 100, instead of at partnersite 200.

At step 805, the user of user device 30 (or 20 or 10) creates a membook at mainsite 100. At step 810 mainsite 100 stores the user's membook in user storage 100.

It will be appreciated that steps 805-810 may precede steps 815-830, or may occur concurrently.

The operation of an enhanced bookmark will now be described.

At step 835, the user requests a webpage from partnersite 200. At step 840, partnersite 200 receives the request and responds by serving the webpage with the enhanced bookmark indicator to the user. User device 30 displays the webpage with the enhanced bookmark indicator.

At step 845, the user actuates the enhanced bookmark indicator, as described above, such as by clicking on it; user device 30 sends the user's actuation to mainsite 100. At step 850, mainsite 100 receives the actuation and updates the user's membook to include the enhanced bookmark information. Any suitable update technique may be used. At step 855, mainsite 100 sends an acceptance update for the enhanced bookmark to user device 30. At step 860, user device 30 changes the display of the enhanced bookmark indicator on the webpage, as described above, to indicate that the associated enhanced bookmark information has been saved to the user's membook.

Some time later, at step 865, the human editor creates an enhanced bookmark update, which may comprise adding information to the existing enhanced bookmark or editing the existing enhanced bookmark, and send the enhanced bookmark update to mainsite 100. At step 870, mainsite 100 updates the stored enhanced bookmark information in EBM storage 120, and if necessary, in user membook storage 110. It will be appreciated that if the membook has only a pointer to the enhanced bookmark, then it is not necessary to update the membook. However, if the membook includes the enhanced bookmark information, then the membook must be updated. At step 875, mainsite 100 sends an enhanced bookmark update notice to user device 30. At step 880, user device 30 receives the enhanced bookmark update notice.

Then, at the user's convenience, at step 885, the user requests his or her membook from mainsite 100. At step 890, mainsite 100 receives the request and serves the membook to the user. User device 30 displays the membook to the user.

It will be appreciated that steps 885-890 may additionally occur prior to steps 865-880.

What is claimed is:

1. A system for providing, to a user, predetermined information augmenting a website, comprising:
    a website server computer coupled to a communication network;
    a file server computer coupled to a communication network;
    a first data storage, coupled to the website server computer, for storing web page information representing a first web page of the website, the web page information including an enhanced bookmark indicator, the enhanced bookmark indicator being (i) associated with enhanced bookmark information and (ii) able to be included in web page information of another web site;
    a second data storage, coupled to one of the website server computer and the file server computer, for storing the enhanced bookmark information, the enhanced bookmark information including information that is distinct from the web page information, the enhanced bookmark information having been created by a human editor other than the user; and
    a third data storage different than the first and second data storages, coupled to the file server computer, for storing a membook file associated with the user;
    wherein the web site server computer is for
        (a) providing via the communication network, to a user device associated with the user, the web page information;
    and wherein the file server computer is for
        (b) receiving via the communication network, from the user device, an actuation of the enhanced bookmark indicator,
        (c) sending via the communication network, to the user device, an acceptance update so that the enhanced bookmark indicator indicates that the enhanced bookmark information has been saved to the membook file,
        (d) storing, in the membook file, the enhanced bookmark information associated with the enhanced bookmark indicator before the enhanced bookmark information is presented to the user, and
        (e) updating the enhanced bookmark information in response to an enhanced bookmark update from the human editor, so that when the user subsequently accesses the membook file, the enhanced bookmark information, as updated by the enhanced bookmark update, is available from the membook file.

2. The system of claim 1, wherein the membook file can be configured by the user to allow other users to view the enhanced bookmark information selected by the user.

3. The system of claim 1, wherein the membook file can be configured by the user to display enhanced bookmark information selected by an entity other than the user.

4. The system of claim 1, wherein the enhanced bookmark information includes at least a title, a thumbnail image and a text field, the text field having information distinct from the web page information.

5. The system of claim 1, wherein the file server computer is also for enabling the user to add information to the membook file.

6. The system of claim 1, wherein one of the first, second and third data storages is also for storing a browser plug-in program for enabling the user to download the memobook file to the user device.

7. The system of claim 1, wherein one of the first, second and third data storages is also for storing an application program for enabling the user to download the memobook file to the user device.

8. The system of claim 1, wherein the file server computer is also for
   (f) sending via the communication network, to the user device, an enhanced bookmark update notice after the enhanced bookmark information has been updated in response to the enhanced bookmark update from the human editor.

9. The system of claim 1, wherein the file server computer is also for
   (g) providing, via the communication network, the memobook file to the user device with enhanced bookmark information adapted to a location of the user.

10. A method for providing, to a user, predetermined information augmenting a website, comprising:
    (a) providing, from a website server computer to a user device associated with the user, web page information stored in a first data storage coupled to the website server computer, the web page information representing a first web page of the website, the web page information including an enhanced bookmark indicator, the enhanced bookmark indicator being (i) associated with enhanced bookmark information and (ii) able to be included in web page information of another web site;
    (b) receiving, at a file server computer from the user device, an actuation of the enhanced bookmark indicator, the enhanced bookmark information being stored in a second data storage coupled to one of the website server computer and the file server computer, the enhanced bookmark information including information that is distinct from the web page information, the enhanced bookmark information having been created by a human editor other than the user;
    (c) storing, by the file server computer, the enhanced bookmark information in a memobook file associated with the user before the enhanced bookmark information is presented to the user, the memobook file being in a third data storage coupled to the file server computer, the third data storage being different than the first and second data storages;
    (d) sending, from the file server computer to the user device, an acceptance update so that the enhanced bookmark indicator indicates that the enhanced bookmark information has been saved to the memobook file; and
    (e) updating, by the file server computer, the enhanced bookmark information in response to an enhanced bookmark update from the human editor;
    whereby when the user subsequently accesses the memobook file, the enhanced bookmark information, as updated by the enhanced bookmark update, is available from the memobook file.

11. The method of claim 10, wherein the the memobook file can be configured by the user to allow other users to view the enhanced bookmark information selected by the user.

12. The method of claim 10, wherein the memobook file can be configured by the user to display enhanced bookmark information selected by an entity other than the user.

13. The method of claim 10, wherein the enhanced bookmark information includes at least a title, a thumbnail image and a text field, the text field having information distinct from the web page information.

14. The method of claim 10, wherein the file server computer is also for enabling the user to add information to the memobook file.

15. The method of claim 10, wherein one of the first, second and third data storages is also for storing a browser plug-in program for enabling the user to download the memobook file to the user device.

16. The method of claim 10, wherein one of the first, second and third data storages is also for storing an application program for enabling the user to download the memobook file to the user device.

17. The method of claim 10, further comprising:
    (f) sending, from the file server computer to the user device, an enhanced bookmark update notice after the enhanced bookmark information has been updated in response to the enhanced bookmark update from the human editor.

18. The method of claim 10, further comprising:
    (g) providing, from the file server computer to the user device, enhanced bookmark information from the memobook file, the enhanced bookmark information being adapted to a location of the user.

* * * * *